(12) United States Patent
Morishita

(10) Patent No.: US 11,515,760 B2
(45) Date of Patent: Nov. 29, 2022

(54) ROTATING ELECTRIC MACHINE FOR VEHICLE

(71) Applicant: DENSO CORPORATION, Kariya (JP)

(72) Inventor: Kazuki Morishita, Kariya (JP)

(73) Assignee: DENSO CORPORATION, Kariya (JP)

( * ) Notice: Subject to any disclaimer, the term of this patent is extended or adjusted under 35 U.S.C. 154(b) by 97 days.

(21) Appl. No.: 16/862,672

(22) Filed: Apr. 30, 2020

(65) Prior Publication Data
US 2020/0259400 A1 Aug. 13, 2020

Related U.S. Application Data

(63) Continuation of application No. PCT/JP2018/039515, filed on Oct. 24, 2018.

(30) Foreign Application Priority Data

Oct. 31, 2017 (JP) .............................. JP2017-210291

(51) Int. Cl.
*H02K 11/05* (2016.01)
*H02K 11/04* (2016.01)
(Continued)

(52) U.S. Cl.
CPC ............. *H02K 11/046* (2013.01); *H01R 4/34* (2013.01); *H01R 13/5205* (2013.01); *H02K 5/10* (2013.01); *H02K 5/225* (2013.01); *H02K 11/05* (2016.01)

(58) Field of Classification Search
CPC .. H02K 5/00; H02K 5/10; H02K 5/22; H02K 5/225; H02K 11/00; H02K 11/04;
(Continued)

(56) References Cited

U.S. PATENT DOCUMENTS 5,433,622 A * 7/1995 Galambos .............. H01R 13/53
439/282
6,150,741 A * 11/2000 Hayashi ................. H02K 5/225
310/68 D
(Continued)

FOREIGN PATENT DOCUMENTS

JP H07-111755 A 4/1995
JP 11167911 A * 6/1999
JP 2017-143021 A 8/2017

OTHER PUBLICATIONS

Jan. 22, 2019 International Search Report issued in International Patent Application No. PCT/JP2018/039515.

*Primary Examiner* — Tran N Nguyen
(74) *Attorney, Agent, or Firm* — Oliff PLC

(57) ABSTRACT

A rotating electric machine for a vehicle includes a rectifier fixed to an outer side of the frame member and constituting a rectification circuit which rectifies the alternating current generated by the stator; a battery terminal protruding from the rectifier and configured to be connected with a battery cable; an insulating member having a through hole in which the battery terminal is inserted; and a waterproof cap attached to the insulating member so as to cover a connection part of the battery terminal with the battery cable in a waterproof state. The insulating member includes an annular protruding part protruding inward from an inner peripheral surface of the through hole. The protruding part is in contact with an outer peripheral surface of the battery terminal in such a state that the protruding part is elastically deformed.

11 Claims, 12 Drawing Sheets

(51) Int. Cl.
*H01R 4/34* (2006.01)
*H01R 13/52* (2006.01)
*H02K 5/10* (2006.01)
*H02K 5/22* (2006.01)

(58) Field of Classification Search
CPC ...... H02K 11/046; H02K 11/05; H02K 19/22; H02K 19/36; H01R 4/00; H01R 4/28; H01R 4/34; H01R 4/30; H01R 4/302; H01R 13/52
See application file for complete search history.

(56) References Cited

U.S. PATENT DOCUMENTS

| | | |
|---|---|---|
| 2006/0273671 A1 | 12/2006 | Oohashi |
| 2008/0079324 A1 | 4/2008 | Aoshima |
| 2010/0291435 A1* | 11/2010 | Garin .................. H01M 50/561 429/180 |
| 2011/0012451 A1 | 1/2011 | Bitzer |
| 2014/0062234 A1* | 3/2014 | Tamura .................. H02K 5/225 310/71 |
| 2016/0226328 A1 | 8/2016 | Chisaka et al. |

* cited by examiner

ROTATING ELECTRIC MACHINE FOR VEHICLE

CROSS-REFERENCE TO RELATED APPLICATION

This application is the U.S. bypass application of International Application No. PCT/JP2018/039515 filed Oct. 24, 2018 which designated the U.S. and claims priority to Japanese Patent Application No. 2017-210291, filed Oct. 31, 2017, the contents of both of which are incorporated herein by reference.

TECHNICAL FIELD

The present disclosure relates to a rotating electric machine for a vehicle.

BACKGROUND

A conventional rotating electric machine for a vehicle is provided with a rectifier for converting alternating current generated in a stator into direct current, and a wire harness is connected to an output terminal attached to the rectifier. For example, in the configuration of JP 2006-340516 A, a molded member obtained by insert-molding a sleeve is fitted around the outer periphery of the output terminal. Then, the molded member and the output terminal are inserted into a hole provided in the housing for protecting the rectifier, so that the output terminal and the connection terminal on the wire harness side can be connected.

SUMMARY

In the first aspect, a rotating electric machine for a vehicle includes a rotor fixed to a rotation shaft; a stator for generating an alternating current as the rotor rotates; a frame member for holding the rotor and the stator; a rectifier fixed to an outer side of the frame member and constituting a rectification circuit which rectifies the alternating current generated by the stator; a battery terminal protruding from the rectifier and configured to be connected with a battery cable; an insulating member having a through hole in which the battery terminal is inserted; and a waterproof cap attached to the insulating member so as to cover a connection part of the battery terminal with the battery cable in a waterproof state, wherein the insulating member includes an annular protruding part protruding inward from an inner peripheral surface of the through hole, and the protruding part is in contact with an outer peripheral surface of the battery terminal in such a state that the protruding part is elastically deformed.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
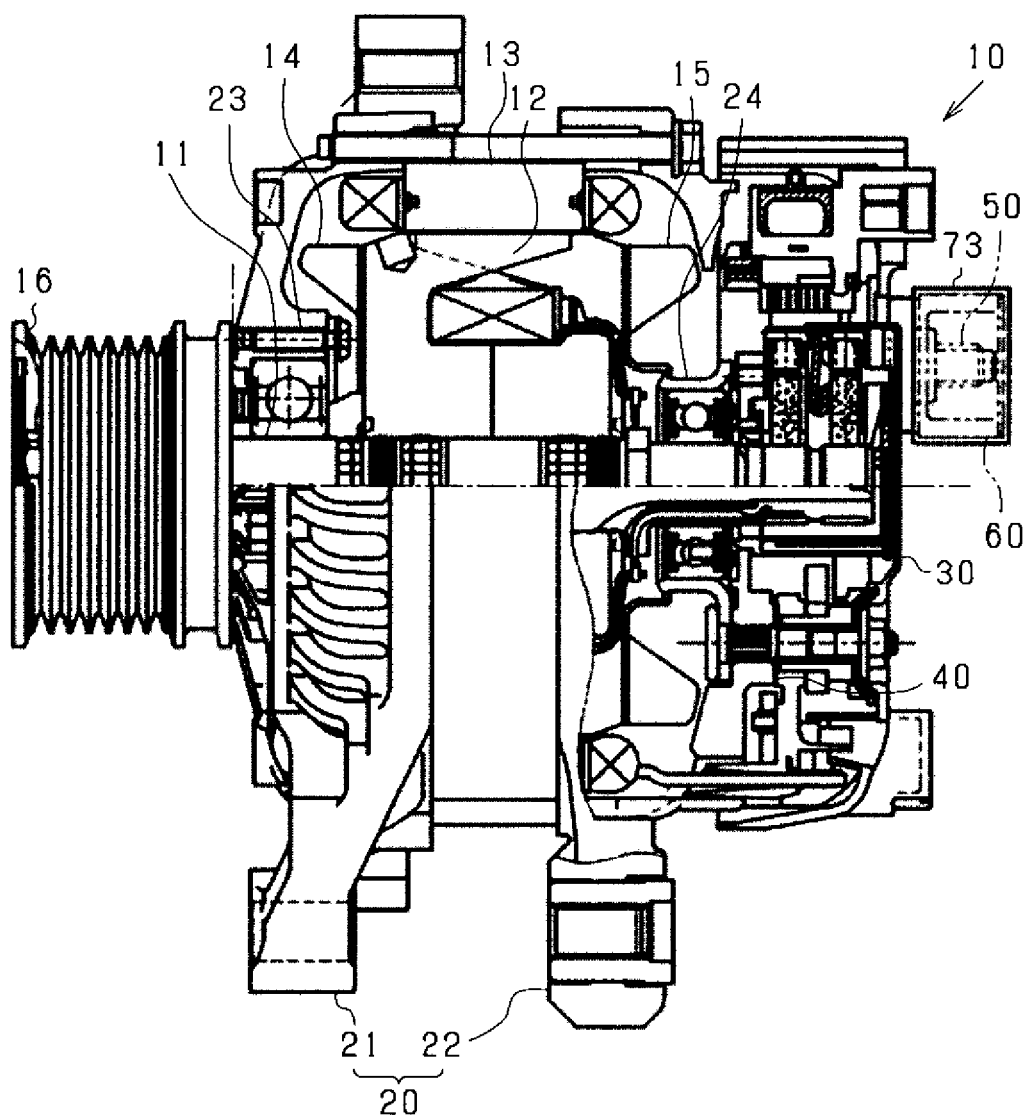
FIG. 1 is an axial sectional view of a rotating electric machine for a vehicle.

The output terminal is exposed to the outside of the cover member through the hole provided in the cover member. In order to waterproof the connection part between the output terminal and the connection terminal on the wire harness side, a waterproof cap for covering the connection part may be attached. On the other hand, holes for heat dissipation and the like are provided in the housing, and when water intrudes into the engine compartment due to, for example, water splashing from the road surface, some water also intrudes inside the housing of the vehicular rotating electric machine. If the water that has entered the housing intrudes inside the waterproof cap through a gap between the output terminal and the cover member provided around it, the connection part between the output terminal and the connection terminal may corrode.

The present disclosure has been devised in view of the above problem, and a main object thereof is to provide a rotating electric machine for a vehicle that can prevent entry of water into a connection portion between an output terminal and an external terminal.

In the first aspect, a rotating electric machine for a vehicle includes a rotor fixed to a rotation shaft; a stator for generating an alternating current as the rotor rotates; a frame member for holding the rotor and the stator; a rectifier fixed to an outer side of the frame member and constituting a rectification circuit which rectifies the alternating current generated by the stator; a battery terminal protruding from the rectifier and configured to be connected with a battery cable; an insulating member having a through hole in which the battery terminal is inserted; and a waterproof cap attached to the insulating member so as to cover a connection part of the battery terminal with the battery cable in a waterproof state, wherein the insulating member includes an annular protruding part protruding inward from an inner peripheral surface of the through hole, and the protruding part is in contact with an outer peripheral surface of the battery terminal in such a state that the protruding part is elastically deformed.

An annular protruding part is provided on the inner peripheral surface of the through hole of the insulating member, and the protruding part comes into contact with the outer peripheral surface of the battery terminal in an elastically deformed state so that the protruding part serves for sealing. In this case, it is possible to prevent water from intruding inside the waterproof cap through the space between the inner peripheral surface of the through hole of the insulating member and the outer peripheral surface of the battery terminal.

In addition, according to the structure in which the protruding part is provided on the inner peripheral surface as described above, assembling the insulating member to the battery terminal brings the protruding part into contact with the battery terminal. This makes it possible to easily achieve appropriate waterproof performance for the battery terminal.

In the second aspect, the protruding part is provided at a distance from the end of the through hole on the connection part side in the axial direction.

In this case, since the position of the protruding part is spaced apart from the end of the through hole on the connection part side in the axial direction, in the section of the through hole from the protruding part (seal part) to the end on the connection part side, a gap is formed between the battery terminal and the inner peripheral surface of the through hole. Therefore, even if water enters from the gap between the protruding part and the battery terminal, the water can be contained inside the through hole, and the water would not reach the connection part.

In the third aspect, the protruding part is deformed along the outer peripheral surface of the battery terminal, and a tip of the protruding part is pointed toward a base side of the battery terminal.

In this case, since the protruding part is deformed along the outer peripheral surface of the battery terminal, a contact area between the protruding part and the outer peripheral surface of the battery terminal can be secured. As a result, the sealing is improved. If water intrudes into a location that is closer to the tip of the battery terminal than the protruding part is, in the case the tip of the protruding part is pointed toward the connection part side, the water is collected in the space between the base of the protruding part and the inner peripheral surface of the through hole. On the other hand, as in this configuration, in the case the tip of the protruding part is pointed toward the base side of the battery terminal (the side opposite to the connection part of the battery terminal), the water is collected in the space between the tip of the protruding part and the outer peripheral surface of the battery terminal. Therefore, in the case the tip of the protruding part is pointed toward the base side, the water that has intruded inside returns to the base side more easily than in the case where it is pointed toward the connection part. Accordingly, intrusion of water to the connection part side can be further suppressed.

In the fourth aspect, the protruding part is provided with an easily deformable part which can be easily elastically deformed.

In this case, since the protruding part is elastically deformed at the easily deformable part, the resistance at the time of insertion of the battery terminal can be reduced. In addition, when the battery terminal is inserted, the protruding part is elastically deformed at the easily deformable part, and it tries to return elastically after the insertion. Thus, it comes into closer contact with the outer peripheral surface of the battery terminal and intrusion of water can be prevented. In the fifth aspect, the easily deformable part is formed on a base side of the protruding part.

In this case, since the easily deformable part is provided on the base side, the base side is deformed so that the tip side comes into contact with the outer periphery of the battery terminal in such a manner that it extends along the outer periphery, and thus the contact area between the protruding part and the battery terminal can be increased.

In the sixth aspect, the protruding part is provided at an end of the through hole on a connection part side in an axial direction, and a section of the battery terminal that comes into contact with the protruding part has a reduced diameter so that the outer peripheral surface of the battery terminal includes a pressure contact face against which a protruding end face of the protruding part is pressed, and a positioning face which comes into contact with a face intersecting with the protruding end face of the protruding part.

In this case, the protruding end face of the protruding part is pressed against the pressure contact face formed by reducing the diameter of the outer peripheral surface of the battery terminal, thereby forming a seal part. Since the face of the protruding part is in contact with the positioning face formed by reducing the diameter of the outer peripheral surface of the battery terminal, the protruding part can also serve for positioning. Even when the face that comes into contact with the positioning face is somewhat hard, by providing the protruding part at the end of the through hole on the connection part side in the axial direction, the distance needed to be traveled while the protruding part is being elastically deformed in the compression direction can be shortened, and thus it is possible to easily press it against the pressure contact face having a reduced diameter.

The insulating member includes a rear cover which covers the rectifier and has an through hole into which the battery terminal is inserted, and a protection member assembled to the through hole of the rear cover and provided with the through hole, the protection member includes a cylindrical part whose outer periphery has a stepped shape, and a part thereof with a reduced outer diameter serves as a held part which is held in the through hole, and the protruding part is provided at a position in an axial direction of the through hole where the held part is held by an inner peripheral surface of the through hole.

In the case where the rear cover and the protection member are separate components, a gap tends to occur between the inner peripheral surface of the through hole and the outer peripheral surface of the battery terminal due to assembly tolerance. Therefore, it is suitable to employ the present configuration in which the protruding part is provided to prevent water intrusion. Further, since the protruding part is provided along the section of the held part in the through hole, even when the protruding part is in contact with the battery terminal at the beginning of the assembling, the thin held part with a reduced diameter is also elastically deformed radially outward, and thus the resistance of insertion can be reduced. Once the protruding part is placed in position, the held part at which the protruding part is provided is held by the inner peripheral surface of the through hole, so that the protruding part can be pressed so as to come into close contact with the battery terminal.

In the eighth aspect, a plurality of protruding parts are provided along an axial direction of the through hole.

In this case, intrusion of water can be further reduced since a plurality of protruding parts are provided.

In the ninth aspect, center positions of inner peripheral edges of the protruding parts are different from each other.

In this case, since the center positions of the inner peripheral edges of the protruding parts are different from each other, the manner in which they contact with the battery terminal differ from each other. This configuration makes it easier to cope with the case where there is a variation in the center position of the battery terminal due to dimensional tolerance.

In the tenth aspect, the protruding part is formed of a material including an elastomer.

In this case, the protruding part can be elastically deformed easier since it is formed of a material containing an elastomer.

In the eleventh aspect, the rotating electric machine is assembled to the vehicle such that the battery terminal extends in a direction intersecting with a direction of gravity, and a lower position of the protruding part in the direction of gravity is closer to a base side than an upper position of the protruding part is.

In this case, since the lower position of the protruding part in the direction of gravity is closer to the rectifier side than the upper position is, even if water intrudes inside, the puddling part which is formed on the lower side of the battery terminal in the direction of gravity and is recessed toward the base side hinders intrusion of water to the connection part side.

First Embodiment

A configuration embodying the ☐rotating electric machine for a vehicle☐ as a rotating electric machine 10 for an AC-powered system will be described below based on the drawings. The same or equivalent parts in the embodiments described below are assigned with the same reference number in the drawings, and an earlier explanation should be referred to regarding those parts having the same reference number as another.

FIG. 1 is an axial sectional view of a rotating electric machine 10. In FIG. 1, the rotating electric machine 10 is the so-called alternator which is linked to the output shaft of a vehicle engine (not shown) via a linking member such as a belt. The rotating electric machine 10 includes a Lundell-type rotor 12 fixed to a rotation shaft 11, a stator 13 provided so as to surround the rotor 12, and a metal frame 20 (corresponding to the ☐frame member☐) holding the rotor 12 and the stator 13. The frame 20 includes a front frame 21 and a rear frame 22 which are arranged in the axial direction of the rotation shaft 11, and these frames 21 and 22 are united via fastening provided by through bolts. In addition, each of the frames 21 and 22 is provided with a hole(s) for heat dissipation, which allows water to intrude inside the frame 20.

Further, as is well known, the rotor 12 includes a field coil and a pair of pole cores. Centrifugal cooling fans 14 and 15 are attached at the axial end faces of the rotation shaft 11 of the pole cores. The frame 20 is provided with bearings 23 and 24, and the rotation shaft 11 and the rotor 12 are rotatably supported by the bearings 23 and 24. A pulley 16 is attached at one end (the end on the front frame 21 side) of the rotation shaft 11, and the pulley 16 is rotationally driven by the vehicle engine. The rotation of the pulley 16 causes the rotor 12 to rotate, and the cooling fans 14 and 15 also rotate together with this rotation, so that air enters and exits from the heat dissipation holes of the frame 20. On the other hand, the stator 13 includes a stator core having an annular shape, and a stator winding wound around the stator core. The stator 13 is fixed in such a state that it is held between the front frame 21 and the rear frame 22.

A rear cover 30 formed of synthetic resin and serving as an insulating cover is attached on the outer side of the rear frame 22 in the axial direction of the rotation shaft 11, and a rectifier 40 serving as a rectifier for rectifying the alternating current generated in the rotating electric machine 10 is accommodated in the space formed between the rear frame 22 and the rear cover 30. The space between the rear frame 22 and the rear cover 30 contains, in addition to the rectifier 40, a regulator and a field coil energization mechanism (not shown).

Figure 2:
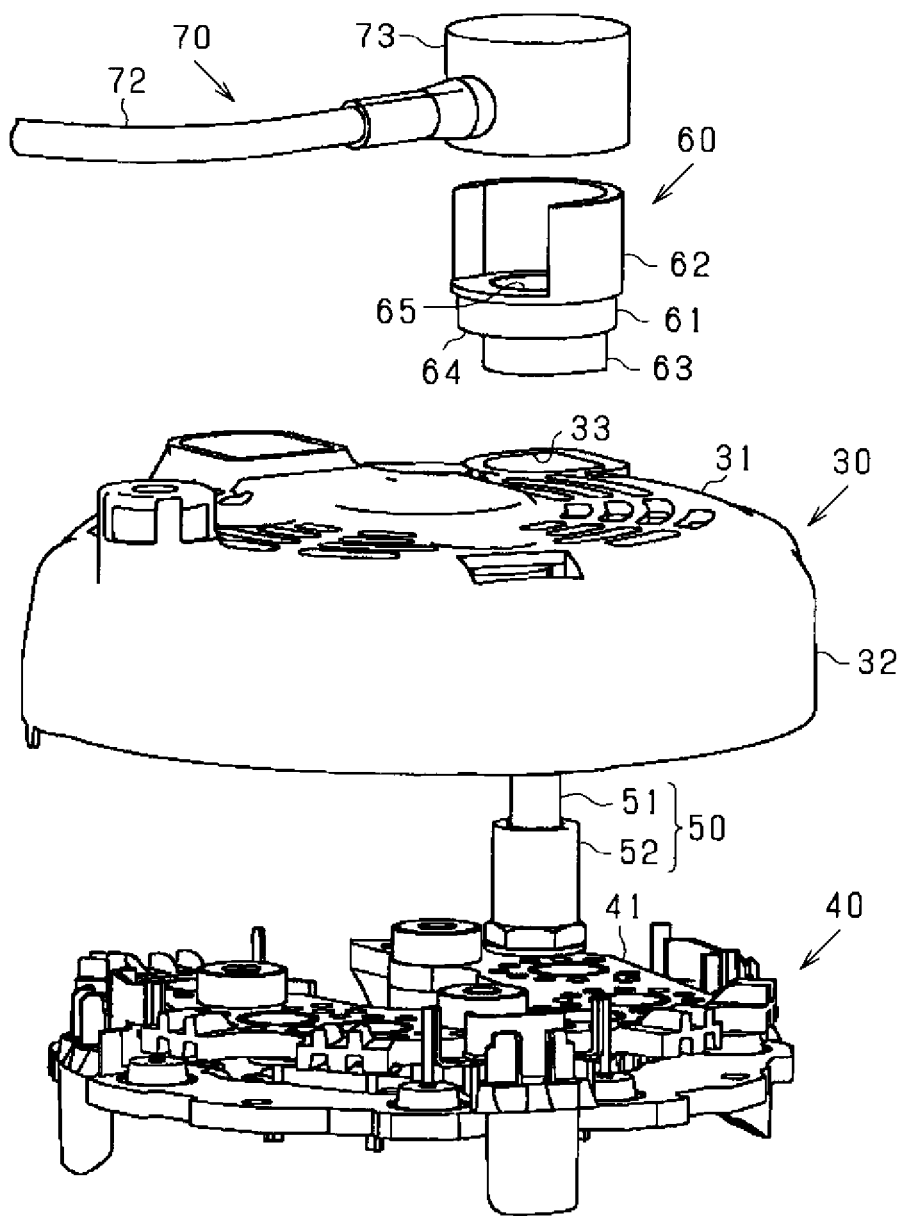
FIG. 2 is a disassembled perspective view of a battery harness to which a rectifier, a rear cover, a protection member, and a waterproof cap are attached, according to a first embodiment.

FIG. 2 is a disassembled perspective view of the rear cover 30 and the rectifier 40. Note that, in the present embodiment, the adopted rotating electric machine 10 is one having a three-phase dual stator winding, and the number of phases of the stator winding is six. Therefore, the rectifier circuit forms a diode bridge circuit comprising a total of six parallel units corresponding to the six-phase current. However, alternatively, the rotating electric machine 10 may have a three-phase alternating current configuration.

The rectifier 40 includes a positive electrode side member 41 provided on the axially (that is, in the axial direction of the rotation shaft 11) outer side of the rear frame 22, and a negative electrode side member not shown. A rectifying element such as a diode is provided in the positive electrode side member 41, so that the rectifier 40 includes a rectifying circuit for rectifying alternating current.

Figure 6:
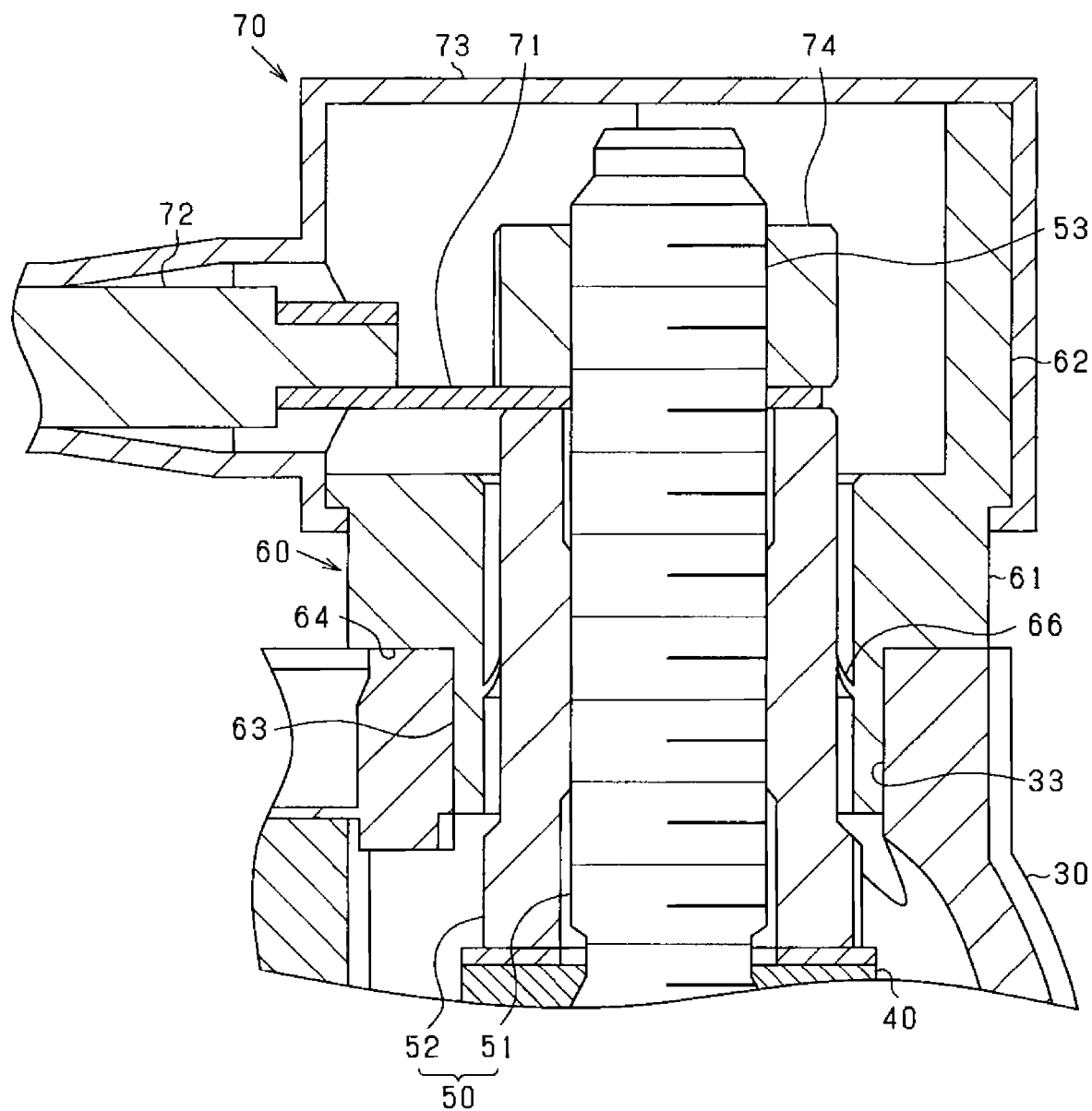
FIG. 6 is a sectional view after the protection member is assembled.

As shown in FIG. 2, a battery terminal 50 protruding from the positive electrode side member 41 is provided as a terminal for outputting the current rectified by the rectifier 40 to the outside, and as shown in FIG. 6, a battery cable 70 is connected to the battery terminal 50. The battery terminal 50 includes a stud bolt 51 having a thread groove formed on the outer periphery thereof, and a cylindrical flange nut 52. The battery terminal 50 is fixed by pressing the stud bolt 51 into a fixing hole provided at a certain position of the positive electrode side member 41 from the rear frame 22 side, and tightening the flange nut 52 from the rear cover 30 side. The tip of the stud bolt 51 (the part protruding from the flange nut 52) forms a connection part 53 with the battery cable 70 (see FIG. 6). The stud bolt 51 is fixed so that its axial direction is parallel to the axial direction of the rotation shaft 11. Note that the stud bolt 51 may be fixed so that its axial direction is perpendicular to the axial direction of the rotation shaft 11.

The rear cover 30 is a member provided on the axially (that is, in the axial direction of the rotation shaft 11) outer side of the rear frame 22 so as to cover the rectifier 40, and it has a top plate 31 and a peripheral wall 32 extending from the periphery thereof. The rear cover 30 is preferably made of an insulating synthetic resin. The rear cover 30 is fixed with respect to the rear frame 22 by fastening provided by a plurality of fixing members at the top plate 31. The top plate 31 is provided with a plurality of air holes for releasing the heat of the rectifier 40. These air holes allow water to enter the space between the rear cover 30 and the rear frame 22. A peripheral wall 32 is provided extending in the axial direction of the rotation shaft 11. The top plate 31 of the rear cover 30 is provided with a through hole 33 through which the battery terminal 50 can be inserted so that the connection part 53 of the stud bolt 51 can be exposed.

Figure 4:
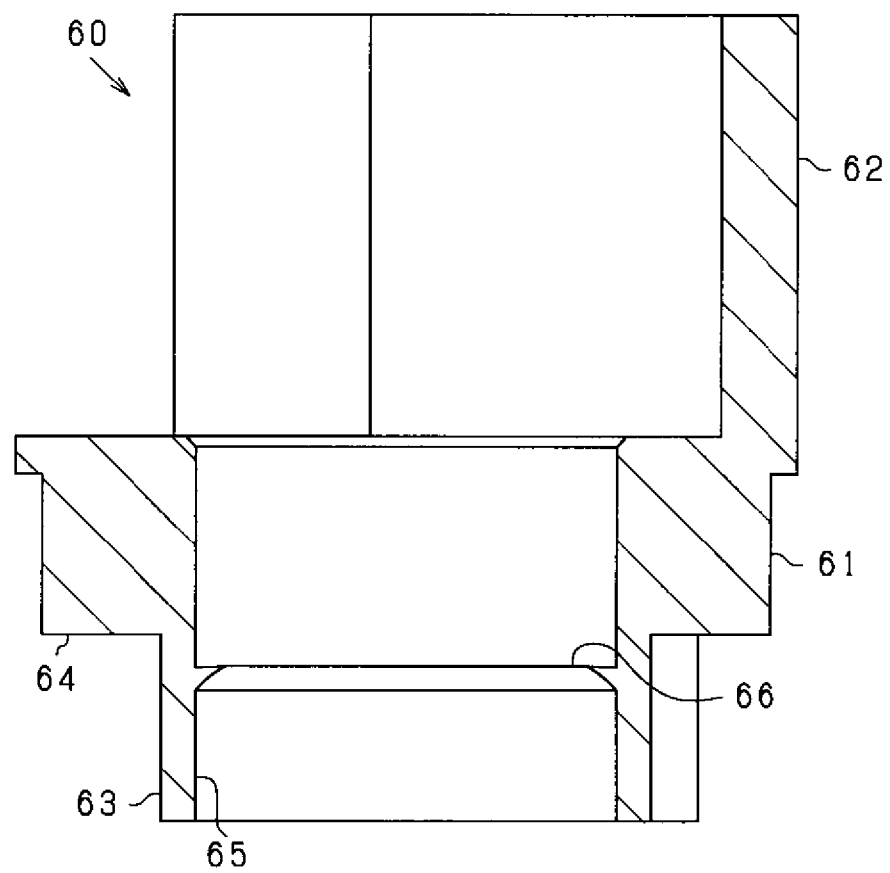
FIG. 4 is a sectional view of the protection member.

As shown in FIG. 6, a protection member 60 is attached to the through hole 33 of the rear cover 30. The protection member 60 is formed of, for example, a synthetic resin containing an elastomer, and has an insulating property and elasticity. As shown in FIGS. 4 and 6, the protection member 60 includes a cylindrical part 61 and a protection wall 62 protruding from an edge of the outer periphery of the cylindrical part 61.

As shown in FIG. 4, the outer periphery of the cylindrical part 61 is formed in a stepped shape, and the portion thereof with a reduced diameter serves as a held part 63 which is held in the through hole 33. Since the held part 63 has a reduced diameter, as shown in FIG. 6, the cylindrical part 61 is provided with a contact face 64 that comes into contact with the rim part of the through hole 33. Further, the end of the cylindrical part 61 opposite to the held part 63 in the axial direction has a slightly larger diameter, so that a waterproof cap 73 described later can be engaged with it. The upper surface of the cylindrical part 61 is flat and is larger than a round terminal 71 described later. The dimension of the cylindrical part 61 in the axial direction is set such that the upper end of the battery terminal 50 (the upper ends of the connection part 53 and the flange nut 52) can be exposed.

As shown in FIG. 4, the held part 63 is formed in a cylindrical shape having a part with a flat face so as to regulate the assembling direction, and it is thinner than the rest of the cylindrical part 61. Further, as shown in FIG. 6, the dimension of the held part 63 in the axial direction is the same as the dimension of the through hole 33 in the axial direction, and the outer diameter of the held part 63 is the same as the inner diameter of the through hole 33.

Figure 3:
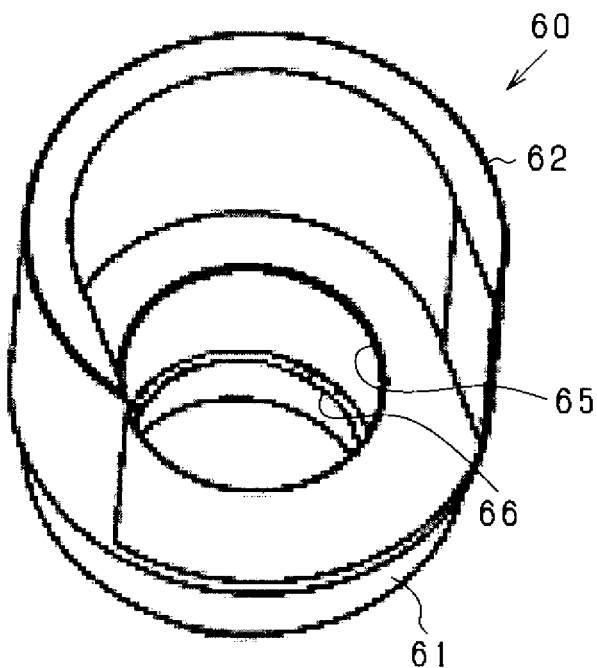
FIG. 3 is a perspective view of the protection member.

As shown in FIGS. 3 and 6, a part of the protection wall 62 is cut out so that components such as the round terminal 71 can enter the region surrounded by the protection wall 62 and the cylindrical part 61. The dimension of the protection wall 62 in the axial direction is set such that the battery terminal 50 is not exposed, and the protection wall 62 prevents the connection part 53 from contacting with the surrounding components.

Figure 5:
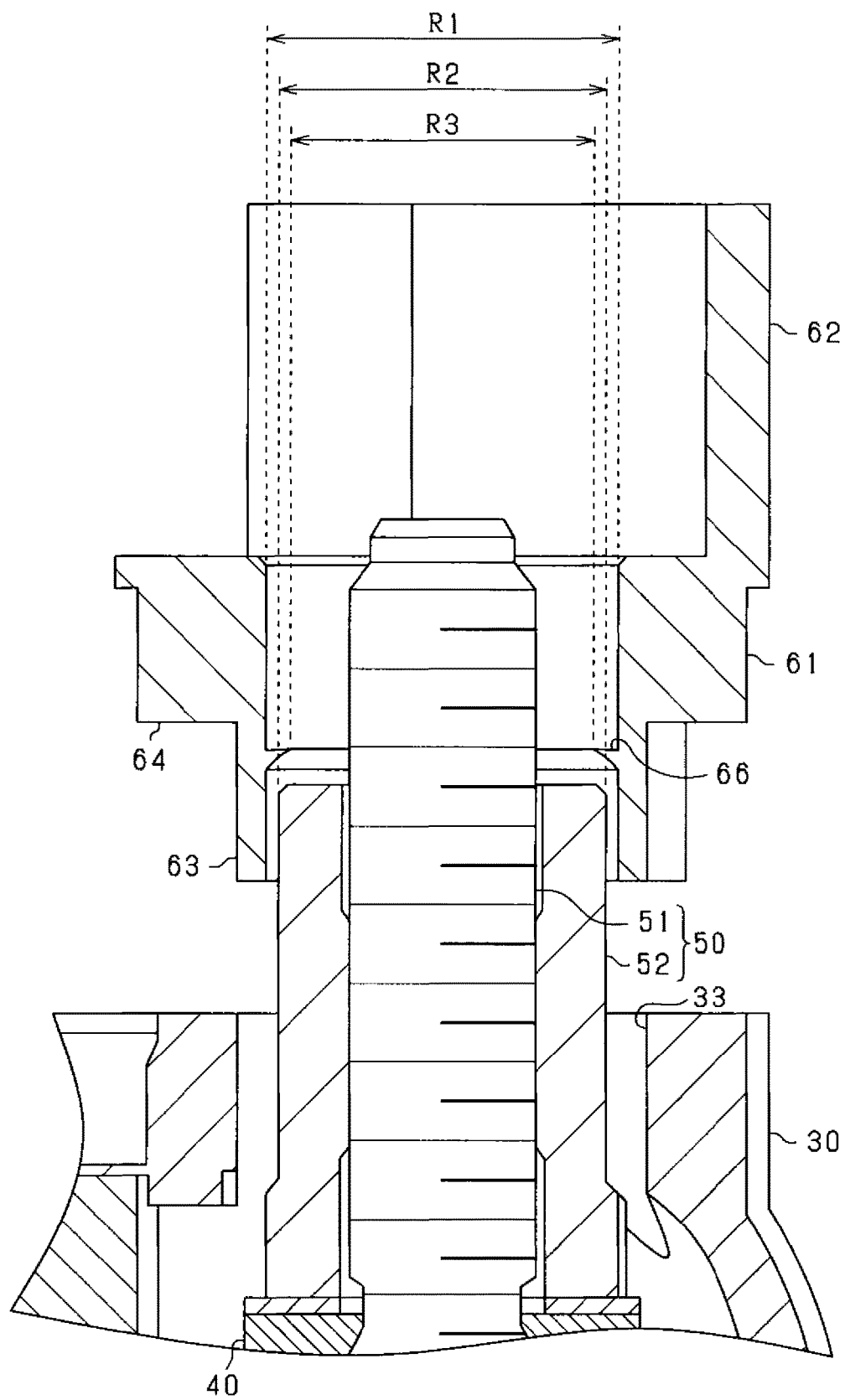
FIG. 5 is a sectional view during assembly of the protection member.

Further, a through hole 65 is provided in the cylindrical part 61 as shown in FIG. 5. The through hole 65 has the same diameter along the entire length of the cylindrical part 61 in the axial direction, and the inner diameter R1 of the through hole 65 is larger than the outer diameter R2 of the battery terminal 50 (the flange nut 52). Since the rear cover 30 and the protection member 60 are separate members, the radial tolerance makes the dimensional difference between R1 of the through hole 65 and the outer diameter R2 of the battery terminal 50 larger than that in the case where the rear cover 30 and the protection member 60 are a single member, and there will be intrusion of water if no measures are taken.

In view of this, as shown in FIGS. 3 and 4, on the inner peripheral surface of the through hole 65, an annular protruding part 66 protruding inward is formed. The protruding part 66 is provided in the through hole 65 at a distance from the end of the battery terminal 50 on the connection part 53 side in the axial direction. More specifically, the protruding part 66 is provided at a position in the axial direction of the through hole 65 where the held part 63 is held by the inner peripheral surface of the through hole 33. As shown in FIG. 6, inside the through hole 65, along the section from the protruding part 66 (seal part) to the end on the connection part 53 side, a gap is formed between the battery terminal 50 and the inner peripheral surface of the through hole 65. Therefore, even if water enters from the space between the protruding part 66 and the battery terminal 50, since water is located at a distance from the connection part 53, the water would not reach the connection part 53. Further, since the protruding part 66 is provided at a position where the held part 63 is held by the inner peripheral surface of the through hole 33, the held part 63 cannot expand in the outer diameter direction. Thus, the protruding part 66 comes into close contact with the outer peripheral surface of the battery terminal 50, and intrusion of water from the rear cover 30 side to the connection part 53 side can be prevented.

The protruding part 66 becomes thinner toward the tip (inner side), and the sectional shape of the protruding part 66 is triangular. The face of the protruding part 66 on the side that comes into contact with the battery terminal 50 is an inclined face that is inclined such that, the closer to the tip of the protruding part, the more it is pointed toward the tip of the battery terminal 50. As shown in FIG. 5, the inner diameter R3 of the protruding part 66 is smaller than the outer diameter R2 of the battery terminal 50 (the flange nut 52), and the maximum dimensional difference between R1 of the through hole 65 and the outer diameter R2 of the battery terminal 50 due to the tolerance is smaller than the protrusion dimension of the protruding part 66. Therefore, the protruding part 66 is deformed along the outer peripheral surface of the battery terminal 50, and a contact area between the protruding part 66 and the outer peripheral surface of the battery terminal 50 can be secured. As a result, the sealing is improved.

As shown in FIGS. 2 and 6, the battery cable 70 includes the round terminal 71, a covered electric wire 72, and the waterproof cap 73. The round terminal 71 is crimped to an end of the covered electric wire 72. The round terminal 71 is inserted into the connection part 53 of the battery terminal 50 and is fastened with a nut 74. Instead of the round terminal 71, a terminal of another shape such as a U terminal may be used.

In addition, the waterproof cap 73 is provided at the end of the covered electric wire 72 so as to cover the connection part 53 between the battery cable 70 and the battery terminal 50. The waterproof cap 73 is formed of a thin, easily deformable material. The waterproof cap 73 is configured so as to come into close contact with the outer peripheral surface of the protection wall 62 and is engaged with the upper end of the cylindrical part 61. The waterproof cap 73 covers the connection part 53 so that it is not directly exposed to water from the outside.

Next, assembly of components such as the rear cover 30 will be described. As shown in FIG. 5, the rear cover 30 is assembled to the rectifier 40 such that the battery terminal 50 protruding from the rectifier 40 is inserted into the through hole 33.

Then, the protection member 60 is assembled to the rear cover 30. The battery terminal 50 is inserted into the through hole 65 from the held part 63 side of the protection member 60. When the protection member 60 is assembled in the assembling direction, the protruding part 66 comes into contact with the flange nut 52 of the battery terminal 50. Since the face of the protruding part 66 that comes into contact with the flange nut 52 is a tapered inclined face, the tip of the protruding part 66 is easily elastically deformed along the outer peripheral surface of the battery terminal 50. Further, since the protruding part 66 is provided on the held part 63 which is relatively thin, when the protruding part 66 and the battery terminal 50 come into contact with each other and a radially outward force of the protruding part 66 is applied, the held part 63 is slightly deformed so that the radially outward force can be released.

Further, in a later stage of the assembling of the protection member 60, the held part 63 is inserted into the through hole 33. Once the held part 63 is inserted into the through hole 33, the held part 63 is held by the inner peripheral surface of the through hole 33, and it cannot expand in the outer diameter direction. This makes the protruding part 66 come into close contact with the outer peripheral surface of the battery terminal 50. Thus, according to the structure in which the protruding part 66 is provided on the inner peripheral surface of the through hole 65, assembling the protection member 60 to the battery terminal 50 brings the protruding part 66 into contact with the battery terminal 50. This makes it possible to easily achieve appropriate waterproof performance for the battery terminal 50.

As shown in FIG. 6, once the protection member 60 is assembled to the rear cover 30, the battery cable 70 is connected to the battery terminal 50. The round terminal 71 is inserted into the connection part 53 of the battery terminal 50 and fastened by the nut 74, so that the round terminal 71 is sandwiched between the flange nut 52 of the battery terminal 50 and the nut 74 and electrically connected with the battery terminal 50. Then, the waterproof cap 73 attached to the end of the covered electric wire 72 so as to cover the connection part 53 is assembled to the protection member 60. The connection part 53 is thus made waterproof.

According to the embodiment described above, the following advantageous effects can be obtained.

An annular protruding part 66 is provided on the inner peripheral surface of the through hole 65 of the protection member 60 which is a part of the insulating member. The protruding part 66 is in contact with the outer peripheral surface of the battery terminal 50 in a state where the protruding part is being elastically deformed, so that the protruding part 66 provides sealing. In this case, it is possible to prevent water from intruding inside the waterproof cap 73 through the space between the inner peripheral surface of the through hole 65 and the outer peripheral surface of the battery terminal 50.

In the present embodiment, the protruding part 66 is provided in the through hole 65 at a distance from the end on the connection part 53 side in the axial direction. Thus, inside the through hole 65, along the section from the protruding part 66 (seal part) to the end on the connection part 53 side, a gap is formed between the battery terminal 50 and the inner peripheral surface of the through hole 65. Therefore, even if water enters from the space between the protruding part 66 and the battery terminal 50, the water can be contained inside the through hole 65, and the water would not reach the connection part 53.

Further, in the case where the rear cover 30 and the protection member 60 are separate components as in the present embodiment, a gap tends to occur between the inner peripheral surface of the through hole 65 and the outer peripheral surface of the battery terminal 50 due to assembly tolerance. Therefore, it is suitable to use the present configuration in which the protruding part 66 is provided to prevent water intrusion. Further, since the protruding part 66 is provided along the section of the held part 63 in the through hole 65, even when the protruding part 66 is in contact with the battery terminal 50 at the beginning of the assembling, the held part 63 is also elastically deformed radially outward, and thus the resistance of insertion can be reduced. Once the protruding part 66 is placed in position, the held part 63 at which the protruding part 66 is provided is held by the inner peripheral surface of the through hole 33, so that the protruding part 66 can be pressed so as to come into close contact with the battery terminal 50.

The protection member 60 formed integrally with the protruding part 66 is formed of a material containing an elastomer. Therefore, the protruding part 66 is more easily elastically deformed.

Second Embodiment

Figure 7:
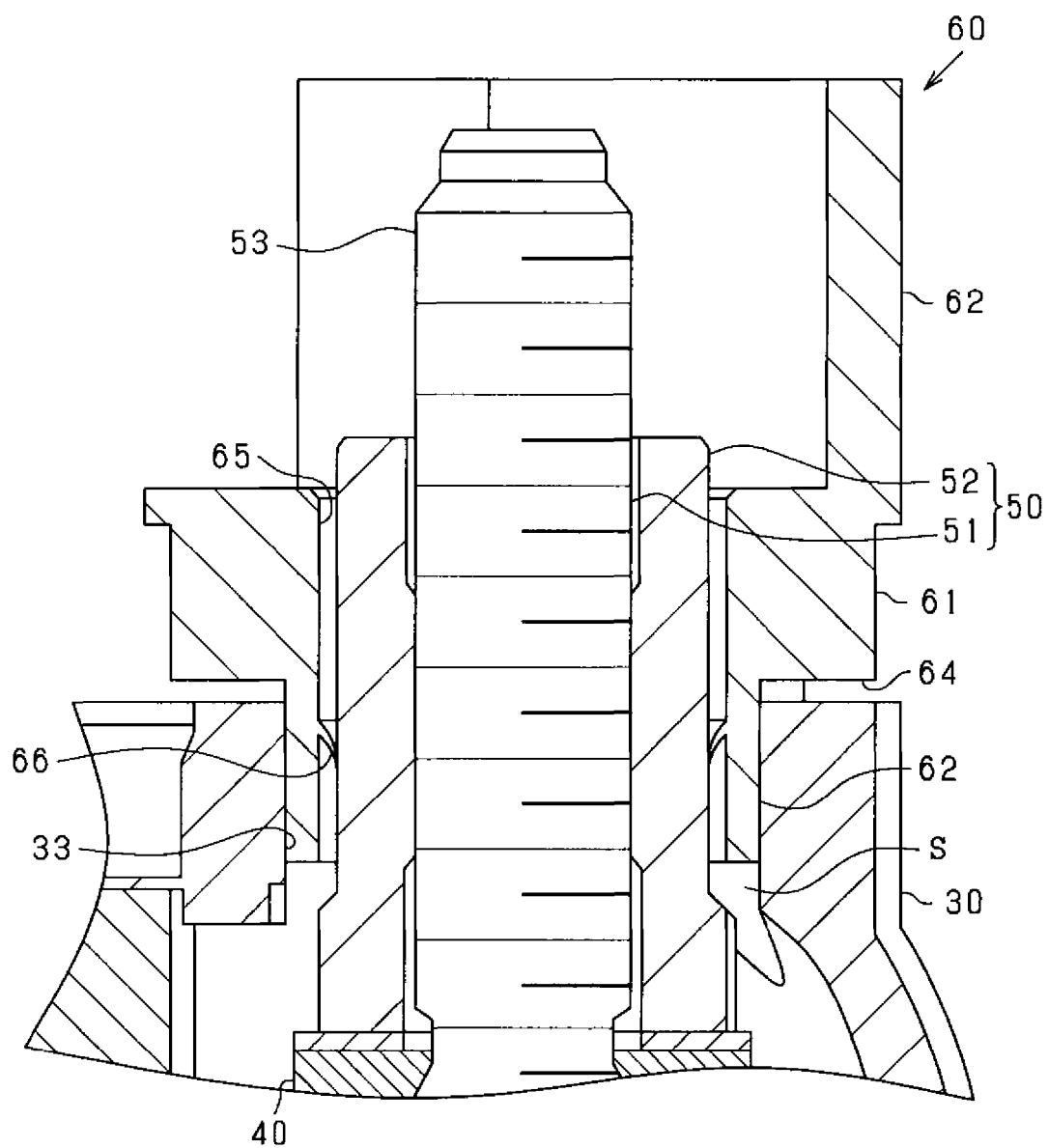
FIG. 7 is a sectional view after the protection member is assembled according to a second embodiment.

In the first embodiment, the tip of the protruding part 66 is pointed toward the tip of the battery terminal 50. In this regard, in the second embodiment, as shown in FIG. 7, the tip of the protruding part 66 is pointed toward the base of the battery terminal 50.

As described above, in order to direct the protruding part 66 toward the base of the battery terminal 50, a push-in space S into which the held part 63 of the protection member 60 can be pushed is formed between the hole rim part of the through hole 33 of the rear cover 30 on the base side and components such as the rectifier 40. The dimension of the push-in space S in the axial direction is preferably larger than the protrusion dimension of the protruding part 66, for example, about twice as large. In addition, in a state where the protection member 60 is assembled and placed in position, a gap whose axial dimension is the same as the axial dimension of the push-in space S is formed between the contact face 64 of the cylindrical part 61 and the hole rim part of the through hole 33 on the tip side.

The protection member 60 is assembled to the through hole 33 with the battery terminal 50 inserted in the through hole 33 of the rear cover 30. When the tip of the protruding part 66 is in position, it is initially pointed toward the connection part 53 due to contact with the outer peripheral surface of the battery terminal 50. From this state, it is further pushed toward the push-in space S until the contact face 64 comes into contact with the hole rim part of the through hole 33 on the tip side, and after that, pulled back to be in position again. This pulling-back movement causes the protruding part 66 to be deformed along the outer peripheral surface of the battery terminal 50 with the tip of the protruding part 66 being pointed toward the base of the battery terminal 50.

Since the protruding part 66 is deformed along the outer peripheral surface of the battery terminal 50, a contact area between the protruding part 66 and the outer peripheral surface of the battery terminal 50 can be secured. As a result, the sealing is improved. In the case where the tip of the protruding part 66 is pointed toward the connection part 53 side, water that has intruded from the base side of the battery terminal 50 to the connection part 53 side through the gap between the protruding part 66 and the battery terminal 50 is collected in the space between the root of the protruding part 66 and the inner peripheral surface of the through hole 65. On the other hand, as in the present embodiment, in the case where the tip of the protruding part 66 is pointed toward the base side of the battery terminal 50 (the side opposite to the connection part 53 of the battery terminal 50), the water is collected in the space between the tip of the protruding part 66 and the outer peripheral surface of the battery terminal 50, and thus the water stays at a position near the location from which it intruded inside as compared with the case where the tip of the protruding portion 66 is pointed toward the connection part 53 side. Therefore, in the case where the tip of the protruding part 66 is pointed toward the base side, the water that has intruded inside returns to the base side more easily than in the case where it is pointed toward the connection part 53. Accordingly, intrusion of water to the connection part 53 side can be further suppressed.

Third Embodiment

Figure 8:
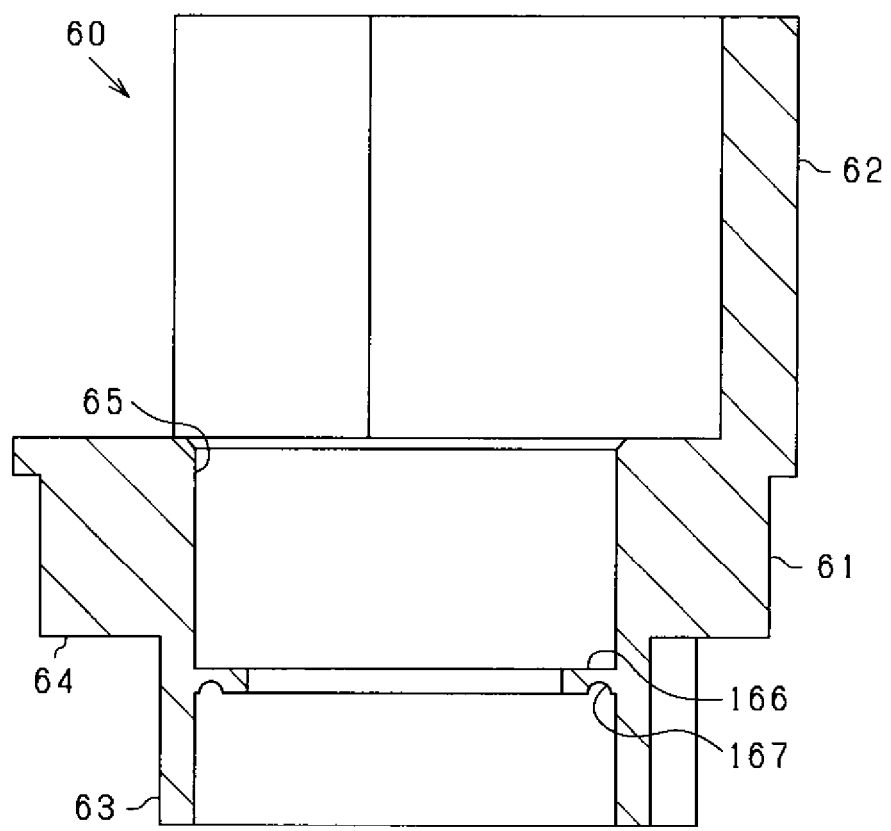
FIG. 8 is a sectional view of the protection member according to a third embodiment.
Figure 9:
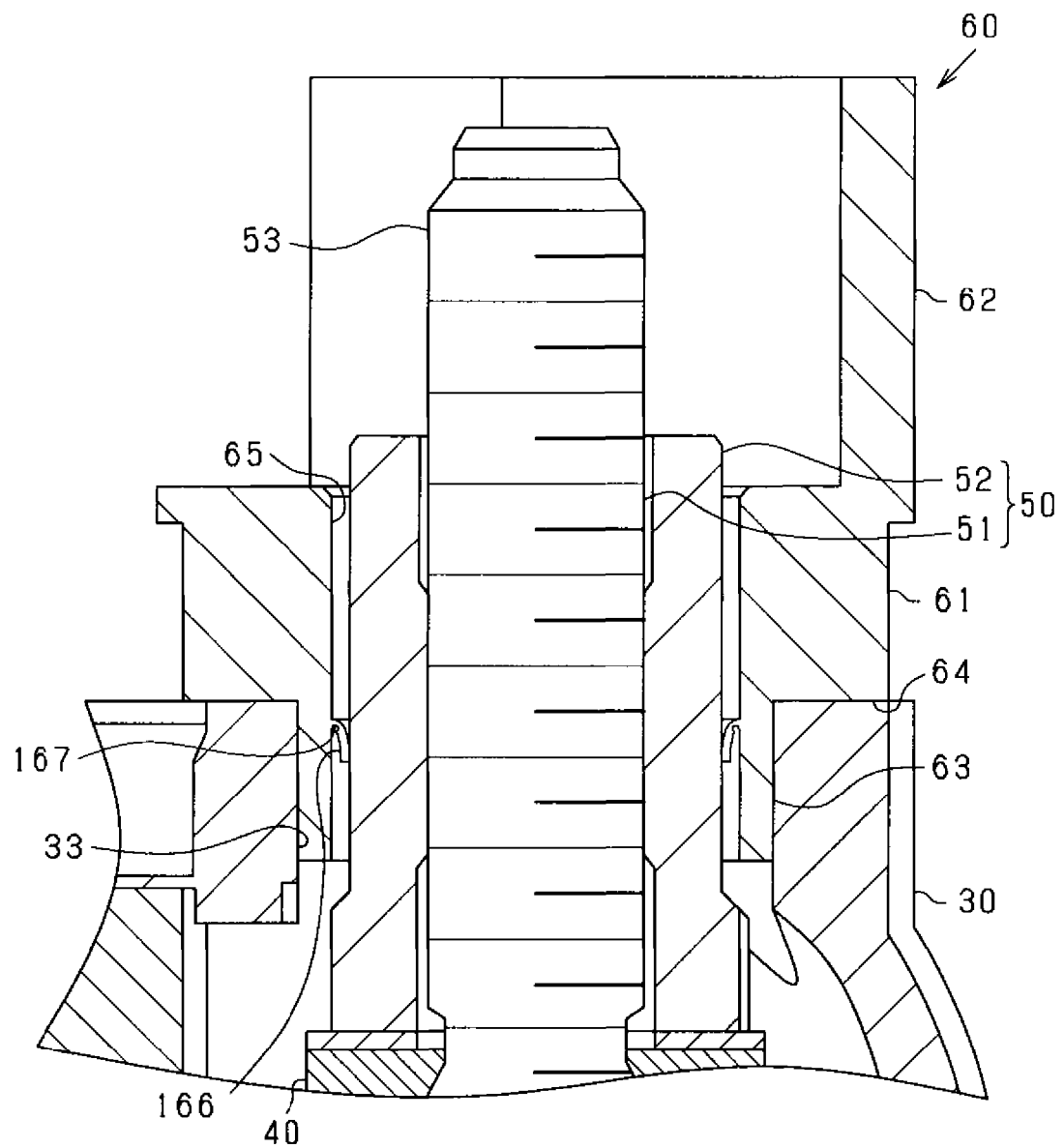
FIG. 9 is a sectional view after the protection member is assembled according to the third embodiment.

In the first embodiment and the second embodiment, the protruding part 66 becomes thinner toward its tip. In this regard, in the third embodiment, as shown in FIGS. 8 and 9, the protruding part 166 is provided with an easily deformable part 167. Note that the position where the protruding part 166 is provided is the same as in the first and second embodiments, and thus its description will be omitted.

The protruding part 166 has a plate-like shape having an even thickness (the dimension in the axial direction), and it protrudes inward from the inner peripheral wall of the through hole 65. The easily deformable part 167 is provided on the base side of the protruding part 166 (at a position near the inner peripheral wall of the through hole 65). A groove is formed at the easily deformable part 167 so that the easily deformable part 167 becomes thinner than the rest of the protruding part 166. Since the easily deformable part 167 is thin, when a force is applied to the protruding part 166, the easily deformable part 167 is elastically deformed. Further, the inner diameter R3 of the protruding part 166 is smaller than the outer diameter R2 of the battery terminal 50 (the flange nut 52), so that the protruding part 166 is elastically deformed at the easily deformable part 167 and comes into close contact with the outer peripheral surface of the battery terminal 50 (the flange nut 52).

Since the protruding part 166 can be elastically deformed at the easily deformable part 167, the resistance exerted when the battery terminal 50 is inserted into the through hole 65 can be reduced. In addition, when the battery terminal 50 is inserted into the through hole 65, the protruding part is elastically deformed at the easily deformable part 167, and it tries to return elastically after the insertion. Thus, it comes into closer contact with the outer peripheral surface of the battery terminal 50 and intrusion of water can be prevented. Further, since the easily deformable part 167 is provided on the base side of the protruding part 166, the base side is deformed so that the tip side comes into contact with the outer periphery of the battery terminal 50 in such a manner that it extends along the outer periphery, and thus the contact area between the protruding part 166 and the battery terminal 50 can be increased. Note that the easily deformable part 167 may be provided at another position in the radial direction of the protruding part 166, such as the center of the protruding part 166 in the radial direction, instead of the base side.

Fourth Embodiment

Figure 10:
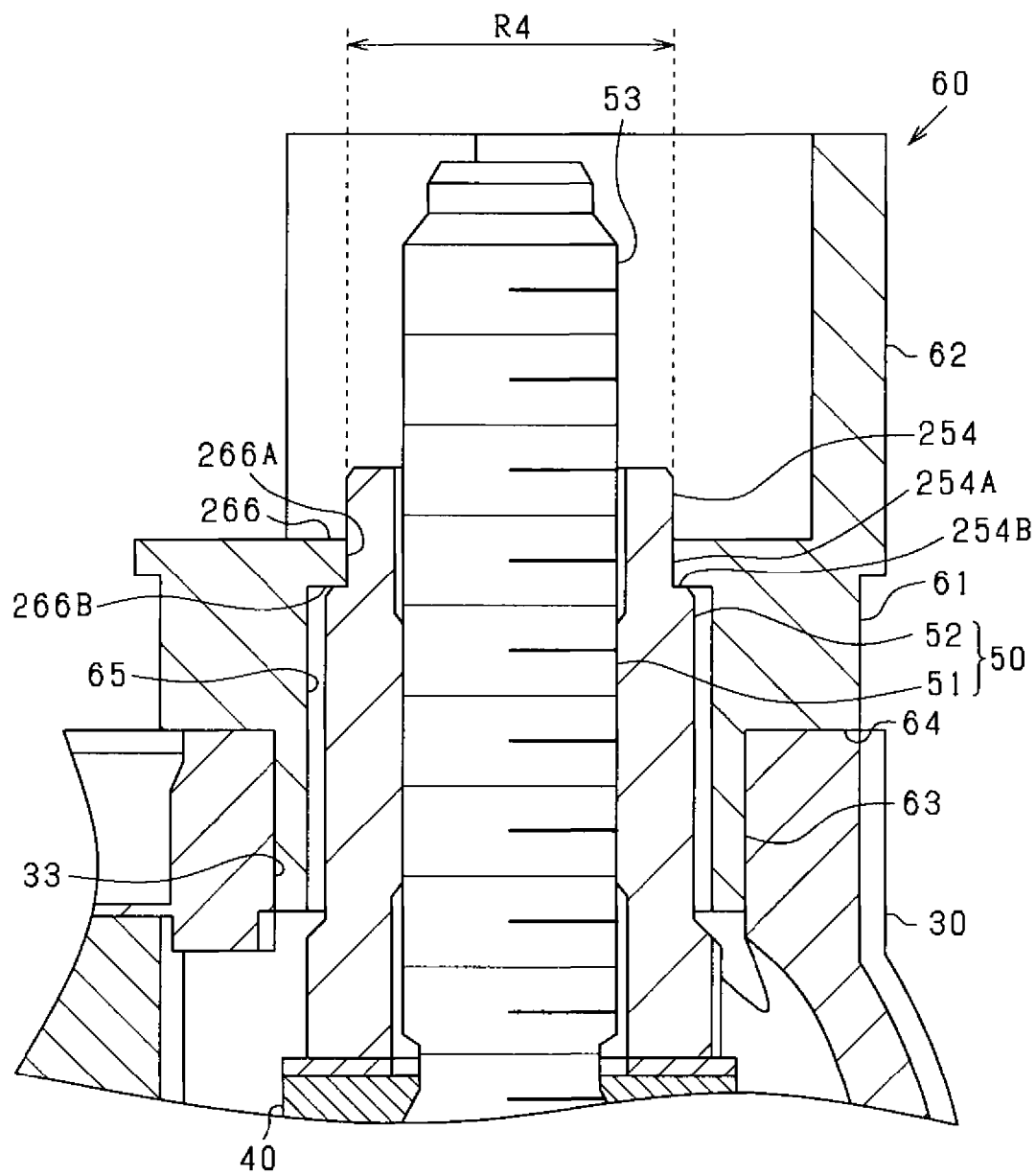
FIG. 10 is a sectional view after the protection member is assembled according to a fourth embodiment.

In the first to third embodiments, the protruding part 66 is provided at a distance from the connection part 53. In this regard, in the fourth embodiment, as shown in FIG. 10, the protruding part 266 is provided at the end of the through hole 65 on the connection part 53 side.

The protruding part 266 has a plate-like shape having an even thickness (the dimension in the axial direction), and the protruding part 266 protrudes inward from the inner peripheral wall at the end of the through hole 65 on the connection part 53 side. The protruding part 266 has a protruding end face 266A at the protruding end, and a face 266B orthogonal to the protruding end face 266A. On the other hand, at the tip of the flange nut 52 of the battery terminal 50 (at the position thereof that comes into contact with the protruding part 266), a reduced-diameter part 254 with a reduced diameter as compared with the rest of the flange nut 52 is formed. The reduced-diameter part 254 has a pressure contact face 254A against which the protruding end face 266A of the protruding part 266 is pressed, and a positioning face 254B which is in contact with the face 266B of the protruding part 266. The outer diameter R4 of the reduced-diameter part 254 is smaller than the outer diameter of the rest of the flange nut 52. Further, the inner diameter R3 of the protruding part 266 is smaller than the outer diameter R4 of the reduced-diameter part 254 of the flange nut 52, so that the protruding part 266 is elastically deformed by being compressed and comes into close contact with the outer peripheral surface of the battery reduced-diameter part 254 of the battery terminal 50.

The protruding end face 266A of the protruding part 266 is pressed against the pressure contact face 254A of the reduced diameter part 254 formed by reducing the diameter of the outer peripheral surface of the flange nut 52 of the battery terminal 50 in such a manner that the protruding part 266 is compressed in the radial direction, and thus the protruding part serves as a seal part. Since the face 266B of the protruding part 266 is in contact with the positioning face 254B of the reduced-diameter part 254 of the battery terminal 50, the protruding part 266 can also serve for positioning. Even when the face 266B that comes into contact with the positioning face 254B is somewhat hard, by providing the protruding part 266 at the end of the through hole 65 on the connection part 53 side in the axial direction, the distance needed to be traveled while the protruding part 266 is in an elastically deformed state can be shortened, and thus it is possible to easily press it against the pressure contact face 254A having a reduced diameter.

Fifth Embodiment

Figure 11:
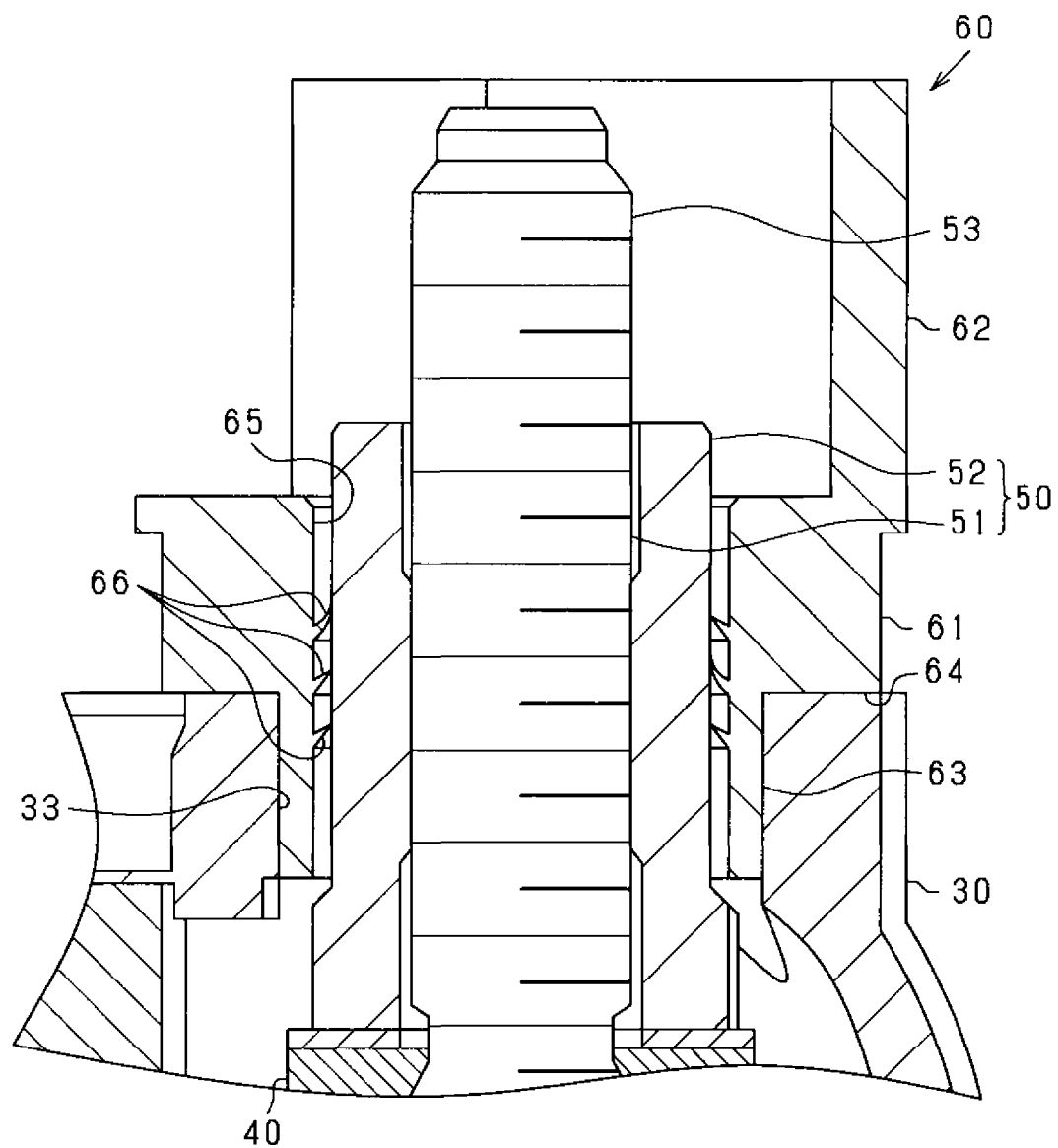
FIG. 11 is a sectional view after the protection member is assembled according to a fifth embodiment.

In the first to fourth embodiments, one protruding part 66 is provided. In this regard, in the fifth embodiment, as shown in FIG. 11, a plurality of (three in the present embodiment) protruding parts 66 are provided along the axial direction of the through hole 65.

Each protruding part 66 becomes thinner toward the tip (inner side), and the sectional shape of the protruding part 66 is triangular. Further, the center positions of the circles drawn by the inner peripheral edges of the protruding parts 66 are different from each other. Therefore, the manner in which the protruding part 66 is in contact with the outer peripheral surface of the battery terminal 50 differs for each of them. Further, the inner diameter R3 of each protruding part 66 is smaller than the outer diameter R2 of the battery terminal 50 (the flange nut 52), so that the protruding part 66 is elastically deformed and comes into close contact with the outer peripheral surface of the battery terminal 50 (the flange nut 52). Note that the tip of each protruding part 66 may be pointed to the base side as in the second embodiment, and the shape of each protruding part 66 may be such that the easily deformable part 167 is provided as in the third embodiment.

Intrusion of water can be further reduced by providing a plurality of protruding parts 66. Further, since the center positions of the inner peripheral edges of the protruding parts 66 are different from each other, the manner in which they contact with the battery terminal 50 differ from each other. This configuration makes it easier to cope with the case where there is a variation in the center position of the battery terminal 50 due to dimensional tolerance.

Sixth Embodiment

Figure 12:
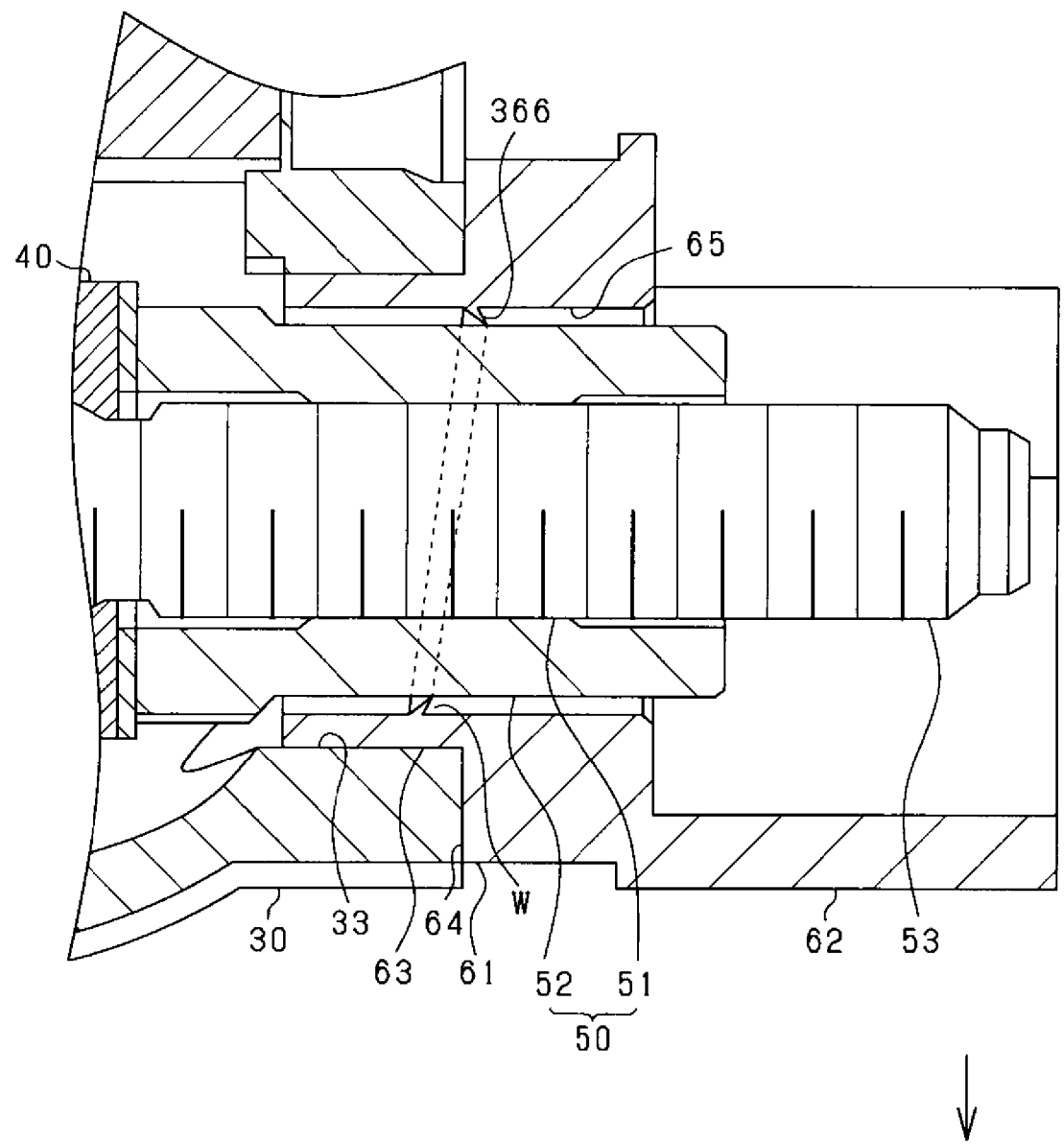
FIG. 12 is a sectional view after the protection member is assembled according to a sixth embodiment.

In the first to fifth embodiments, the direction in which the battery terminal 50 extends with respect to the direction of gravity after the rotating electric machine 10 has been assembled to the vehicle is not particularly specified. In this regard, in the sixth embodiment, as shown in FIG. 12, the rotating electric machine 10 is assembled to the vehicle such that the battery terminal 50 extends in the direction intersecting the direction of gravity. In FIG. 12, the direction of the arrow indicates the direction of gravity.

The protruding part 366 becomes thinner toward the tip (inner side), and the sectional shape of the protruding part 366 is triangular. The tip is pointed toward the base side of the battery terminal 50. Further, the lower position of the protruding part 366 in the direction of gravity is closer to the base side of the battery terminal 50 than the upper position is, and the circular shape drawn by the inner peripheral edge of the protruding part 366 is elliptical. Therefore, even if water intrudes inside, the water that has intruded accumulates in a puddling part W formed in the gap near the root (the inner peripheral wall of the through hole 65) of the lower position of the protruding part 366 in the direction of gravity. Further, the inner diameter R3 of the protruding part 366 is smaller than the outer diameter R2 of the battery terminal 50 (the flange nut 52), so that the protruding part 66 is elastically deformed and comes into close contact with the outer peripheral surface of the battery terminal 50 (the flange nut 52). Note that the tip of each protruding part 366 may be pointed to the base side as in the second embodiment, and the shape of each protruding part 366 may be such that the easily deformable part 167 is provided as in the third embodiment.

Since the lower position of the protruding part 366 in the direction of gravity is closer to the base side of the battery terminal 50 than the upper position is, even if water intrudes inside, the puddling part W which is formed on the lower side of the battery terminal 50 in the direction of gravity and is recessed toward the base side hinders intrusion of water to the connection part 53 side.

Other Embodiments

The above-described embodiments may be modified, for example, as follows.

Although the protection member 60 and the rear cover 30, which are insulating members, are separate components in the first to sixth embodiments, they may be formed integrally. When they are integrally formed, the contact becomes even tighter as the assembly error is reduced.

Although the center positions of the circles drawn by the inner peripheral edges of the protruding parts 66 are different in the fifth embodiment, they may be the same.

Figure 13:
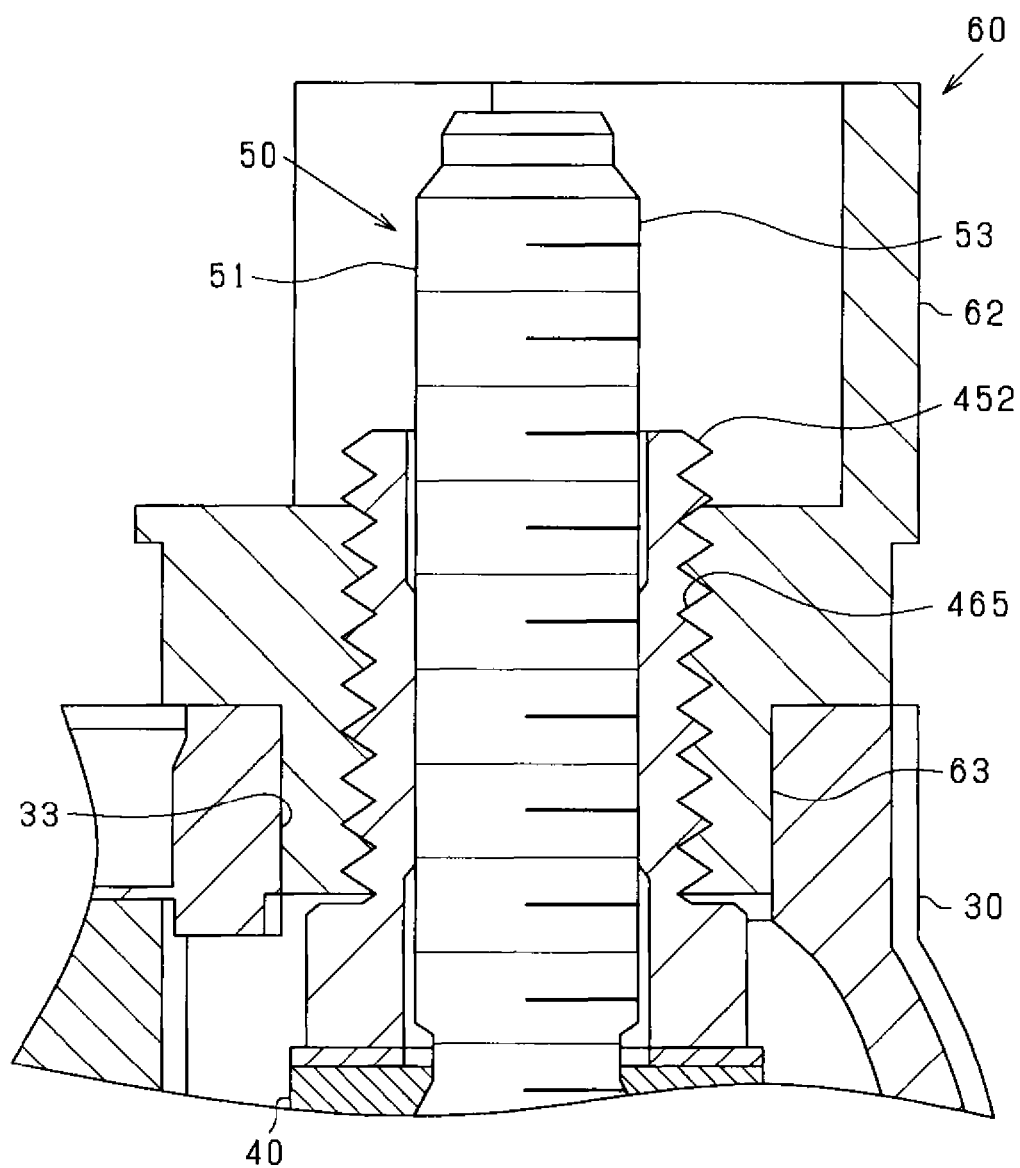
FIG. 13 is a sectional view after the protection member is assembled according to another embodiment.

FIG. 13 shows an example of waterproofing by a method other than elastic deformation of the protruding part. A screw groove is formed on the outer peripheral surface of the flange nut 452 of the battery terminal 50, and also a screw groove is formed on the inner peripheral surface of the through hole 465. The protection member 60 is assembled by screwing the flange nut 452 into the through hole 465. Since the interface path of the contacting faces of the inner peripheral surface of the through hole 465 and the outer peripheral surface of the flange nut 452 becomes longer in this configuration, intrusion of water to the connection part 53 side is less likely to occur.

Although the present disclosure is described based on examples, it should be understood that the present disclosure is not limited to the examples and structures. The present disclosure encompasses various modifications and variations within the scope of equivalence. In addition, the scope and the spirit of the present disclosure include other combinations and embodiments, only one component thereof, and other combinations and embodiments that are more than that or less than that.

What is claimed is:

1. A rotating electric machine for a vehicle, the machine comprising:
a rotor fixed to a rotation shaft;
a stator for generating an alternating current as the rotor rotates;
a frame member for holding the rotor and the stator;
a rectifier fixed to an outer side of the frame member and constituting a rectification circuit which rectifies the alternating current generated by the stator;
a battery terminal protruding from the rectifier and configured to be connected with a battery cable;
an insulating member having an inner peripheral surface that forms a through hole in which the battery terminal is inserted, a gap being present between the inner peripheral surface of the insulating member and an outer peripheral surface of the battery terminal; and
a waterproof cap attached to the insulating member so as to cover a connection part of the battery terminal with the battery cable in a waterproof state, at least a portion of the connection part of the battery terminal being located within an internal volume of the waterproof cap, wherein
the insulating member includes an annular protruding part protruding inward from the inner peripheral surface and toward a central axis of the through hole, and
the protruding part spans the gap between the inner peripheral surface of the insulating member and the outer peripheral surface of the battery terminal so as to be in contact with the outer peripheral surface of the battery terminal in such a state that the protruding part is elastically deformed.

2. The rotating electric machine for a vehicle according to claim 1, wherein
the protruding part is spaced, in an axial direction, from an end of the through hole located closest to the connection part of the battery terminal.

3. The rotating electric machine for a vehicle according to claim 1, wherein
the protruding part is deformed along the outer peripheral surface of the battery terminal, and a tip of the protruding part is pointed toward a base side of the battery terminal.

4. The rotating electric machine for a vehicle according to claim 1, wherein
the protruding part is provided with a deformable part which can be elastically deformed.

5. The rotating electric machine for a vehicle according to claim 4, wherein
the deformable part is formed on a base side of the protruding part.

6. The rotating electric machine for a vehicle according to claim 1, wherein
the protruding part is provided at an end of the through hole located, in an axial direction, closest to the connection part of the battery terminal, and
a section of the battery terminal that comes into contact with the protruding part has a reduced diameter so that the outer peripheral surface of the battery terminal includes (i) a pressure contact face, a protruding end face of the protruding part being pressed against the pressure contact face, and (ii) a positioning face which comes into contact with a face intersecting with the protruding end face of the protruding part.

7. The rotating electric machine for a vehicle according to claim 1, wherein
the insulating member includes (i) a rear cover, which covers the rectifier and has a through hole into which the battery terminal is inserted, and (ii) a protection member assembled to the through hole of the rear cover and provided with the through hole of the insulating member,
the protection member includes a cylindrical part, an outer periphery of which has a stepped shape, and a part of the cylindrical part with a reduced outer diameter serves as a held part which is held in the through hole of the rear cover, and the protruding part is provided at a position in an axial direction of the through hole where the held part is held by an inner peripheral surface of the rear cover that forms the through hole of the rear cover.

8. The rotating electric machine for a vehicle according to claim 1, wherein a plurality of protruding parts are provided along an axial direction of the through hole.

9. The rotating electric machine for a vehicle according to claim 8, wherein center positions of circles drawn by inner peripheral edges of the protruding parts are different from each other.

10. The rotating electric machine for a vehicle according to claim 1, wherein the protruding part is formed of a material including an elastomer.

11. The rotating electric machine for a vehicle according to claim 1, wherein the rotating electric machine is assembled to the vehicle such that the battery terminal extends in a direction intersecting with a direction of gravity, and a lower position of the protruding part in the direction of gravity is closer to a base side than is an upper position of the protruding part.

\* \* \* \* \*